United States Patent [19]

Bushey

[11] Patent Number: 4,602,555
[45] Date of Patent: Jul. 29, 1986

[54] PRELOADED TABLE COUPLING

[75] Inventor: John A. Bushey, Long Lake, Minn.

[73] Assignee: MTS Systems Corporation, Eden Prairie, Minn.

[21] Appl. No.: 575,813

[22] Filed: Feb. 1, 1984

[51] Int. Cl.$^4$ ................................................. F01B 1/02
[52] U.S. Cl. ........................................ 92/61; 92/134; 92/146; 92/166; 92/DIG. 1; 108/20
[58] Field of Search ............... 92/61, 130 B, 134, 146, 92/153, 166, 167, DIG. 1; 108/20, 147; 269/71, 73

[56] References Cited

U.S. PATENT DOCUMENTS

| | | | |
|---|---|---|---|
| 2,193,736 | 3/1940 | Onions | 92/134 |
| 2,663,143 | 12/1953 | Joy | 92/166 |
| 3,311,030 | 3/1967 | Halstead | 92/118 |
| 3,314,336 | 4/1967 | Jorgji | 92/118 |
| 3,355,993 | 12/1967 | Williamson | 91/171 |
| 3,420,148 | 1/1969 | Doerfer | 92/107 |
| 3,442,120 | 5/1969 | Russenberger et al. | 73/92 |
| 3,608,434 | 9/1971 | Hillberry | 91/512 |
| 3,921,286 | 11/1975 | Petersen | 308/3 R |
| 3,952,632 | 4/1976 | Eriksson | 92/117 R |
| 3,962,956 | 6/1976 | Jacobellis | 91/418 |
| 3,994,540 | 11/1976 | Petersen | 308/3 R |
| 4,012,909 | 3/1977 | Hibbard | 91/418 |
| 4,178,838 | 12/1979 | Stafford | 91/39 |
| 4,380,901 | 4/1983 | Rautimo | 92/134 |

Primary Examiner—Abraham Hershkovitz
Attorney, Agent, or Firm—Kinney & Lange

[57] ABSTRACT

Table couplings for coupling hydraulic actuators to large shaking tables, such as earthquake simulator tables are preloaded under gaseous pressure to permit the couplings to be nontension carrying couplings, which in turn permits use of hydrostatic slip bearings between the side surfaces and the bottom surface of the table and the actuators. The hydrostatic bearings in turn reduce the need for swivels, links and yokes that carry both tension and compression. The use of compression only loading such as that permitted with the present device, also reduces the problem of making a satisfactory table foundation, because only compression loads are carried to the foundation rather than alternating tension-compression loads.

5 Claims, 4 Drawing Figures

PRELOADED TABLE COUPLING

BACKGROUND OF THE INVENTION

1. Field of the Invention

The present invention relates to preloaded table couplings for shaker test tables.

2. Description of the Prior Art

Shaker tables have long been used for testing various structures, particularly for testing structures that are designed to withstand earthquake loads. The table is moved to simulate an earthquake load by having actuators shake the table in various movements simulating those which occur during an actual earthquake.

There are several problems that have to be solved in adequately moving and loading a table of this type. The motion of the table relative to the reaction mass must be allowed in all degrees of freedom by the load coupling mechanism; the load path must be rigid; and hydraulic power requirements, which can be rather substantial when shaking a large table and the supported test structure must be minimized. Also, the kinematics of the mechanism should be designed to minimize the cross coupling motion between the different axes; the moving mass should be as small as possible to minimize acceleration forces, and keep the natural frequencies high; and the friction of the couplings should be minimized to reduce system acceleration distortion due to friction.

A further factor that has to be considered is that the reaction mass (or foundation mass) is generally made of reinforced concrete. Concrete does not carry tension loads very well, so cyclic loading that involves tension loads complicates the problem of support.

Typical shaking tables may use swivel bearings (part spherical rod end type bearings) on both ends of the actuators that drive the mass, or a separate link may be connected between the load connection and the end of the rod of a rigid pedestal-mounted actuator. When a link is used between the load and actuator, swivel bearings are placed in the ends of the link.

Hydrostatic bearing pairs have been used for driving a table mounted yoke. In such a situation the hydrostatic bearings are mounted on opposite side surfaces of a yoke that attaches to the table. The hydrostatic bearings cannot carry tension, and thus a support that has bearings on its opposite sides is linked to the table. For example, a "U" shaped member with the bottom of the U being parallel to the table, and the legs of the U connected to the table may be used. Hydrostatic bearings are placed on opposite sides of the bottom leg of the "U" in order to provide loading in both directions, (tension and compression) on the side legs of the "U". The bearings react against a toroidal structure which is attached to the actuator rod.

Additionally, in prior art fatigue testing machines used for testing specimens under cyclic loads, the concept of preloading such specimens to a particular level comprising a "mean" load is well known in the art. For example, in U.S. Pat. No. 3,442,120, issued to Russenberger et al. on May 6, 1969, hydraulic cylinders carrying mean loads through a separate loading section of the actuator is shown. The separate section maintains a load on the actuator using accumulators. The reciprocating actuator is cycled in a cyclic load above and below the mean load for fatigue testing. The mean load can be adjusted to desired levels.

The use of hydrostatic slip bearings on table surfaces also is known. These slip bearings may provide a part spherical coupling to the surface, and typical patents showing such slip bearings, which provide a varying pressure in accordance with the load on the bearings and provide a part spherical piston are shown in the U.S. Pat. Nos. 3,994,540 and 3,921,286. Thus, a swivel connection can be utilized through such bearings so long as the bearings are maintained under compression at all times. The bearings will not carry tension loads because the bearing sections will separate.

SUMMARY OF THE INVENTION

The present invention relates to preloaded table couplings for use with shaker tables, which are large tables supporting masses that are to be tested under differing loads simulating, for example, earthquake loading. The preload is achieved by utilizing actuators that have a section that can be pressurized with a gas, as shown, nitrogen, and which will exert a load on the actuator and against the coupling. This load is reacted by an actuator located on the opposite side of the table. The weight of the table and specimen is supported by actuators positioned below the table. The compression loading on the hydrostatic couplings is maintained, and the loads are coordinated between actuators so that the actuators will maintain the loading cycle at a desired level.

The system of loading is symmetrical, and the foundation loads are balanced so that the table and foundation is balanced both with respect to the weight and to the induced stresses. Because of the kinematics of the pedestal mounted actuators with the slide bearing interface to the table, "cross coupling" of motion, that is the influence from the motion of one of the actuators on the table movement, is minimized. The foundation design is simplified because large compression loads and no tension loads will be placed on the foundation. Concrete is normally used for the foundation and concrete carries high compression loads well.

DETAILED DESCRIPTION OF THE PREFERRED EMBODIMENTS

Figure 2:
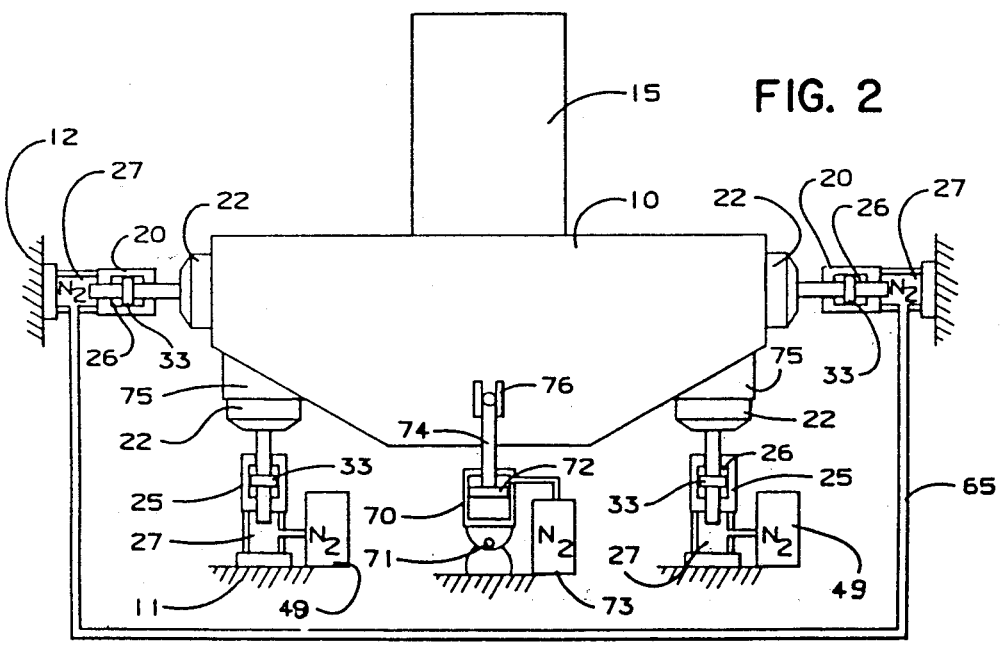
FIG. 2 is a side elevational view of the table of FIG. 1 showing the weight support actuators and a holddown actuator.

The shaker table illustrated generally at 10 comprises a relatively rigid table structure that is supported with respect to a seismic mass illustrated generally only at 11 which usually is a type of a "floating" concrete base or loading pad at the bottom, as shown in FIG. 2. Side walls shown at 12 are also made of concrete and of substantial mass. The table 10 can be made up as a rigid welded, honeycomb type structure that is made to support a test specimen indicated generally at 15. Specimen 15 may be a structure that is to be tested in an earthquake simulation test, for example. The mass of the table may be in the range of 50 tons, and the mass of the specimen 15 in the range of 75 tons. Thus, it can be seen that extremely high loads are encountered in test and to cycle such loads under tension and compression requires a very substantial base particularly if tension loads are applied to such base. Tables made of steel are generally used although aluminum and magnesium, while more expensive to fabricate, have also been used.

Figure 1:
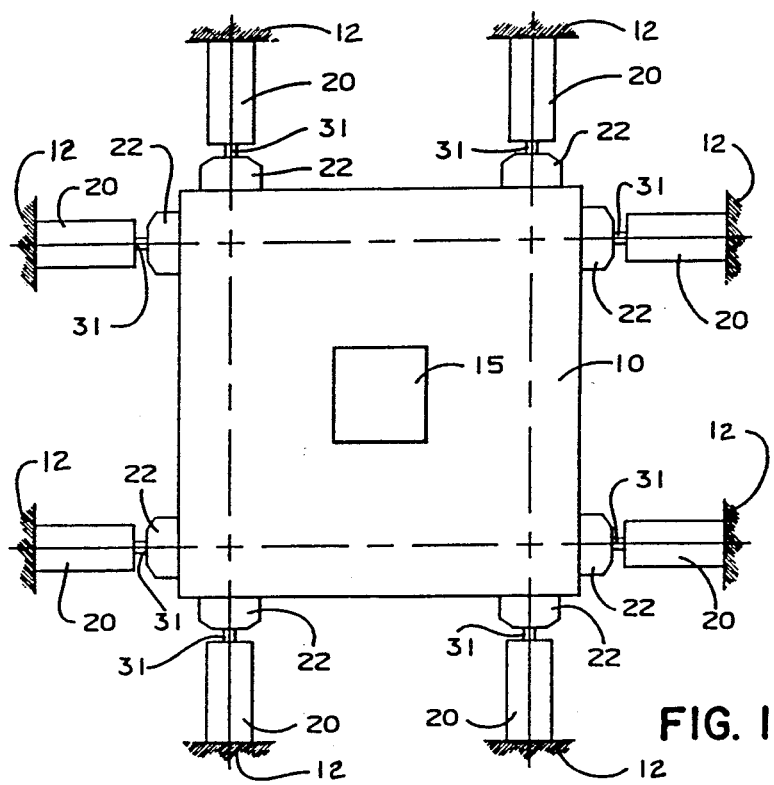
FIG. 1 is a top plan view of a typical shaker table including couplings for the actuator made according to the present invention.

A plurality of horizontal actuators illustrated generally at 20 are provided and each of the actuators is loaded against a table surface through the use of a hydrostatic pad or bearing 22. As shown in FIG. 1, there are eight horizontal actuators around the periphery of the table which accommodate horizontal movements and loads and a plurality of vertical loading actuators 20 are shown in FIG. 2. In FIG. 1, the intersecting lines at the corners and in the center of the table represent locations of the vertical actuators. The vertical actuators support the table weight and the specimen weight in addition to applying the test loads. As will be explained, hold-down actuators are also utilized on the table for keeping the vertical actuators under compression during operation.

Figure 3:
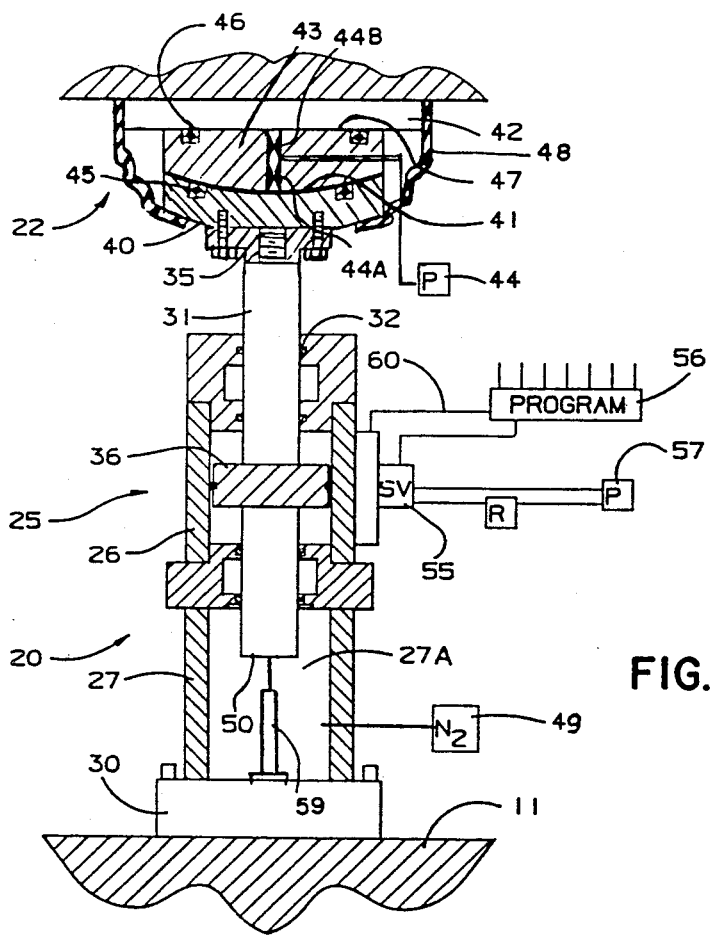
FIG. 3 is a vertical sectional view through a typical actuator utilized in the present system, and a part schematic view of a typical slide bearing utilized.

A typical actuator 20 and a typical pad or bearing 22 are shown in FIG. 3. Each actuator 20 includes an actuator housing 25 that is divided into an upper cylinder section 26 and a lower cylinder section 27. These are cylindrical housings that are supported with a base member 30 onto the base or support 11. A reciprocal actuator rod 31 is mounted through suitable seals 32 at the upper end of the housing 25. The actuator rod 31 has an integral piston section 33 mounted on the interior of the upper cylinder section 26. The rod 31 extends into the lower or base cylinder section 27 as shown, and also extends outwardly to be coupled with a suitable coupling 35 to one of the hydrostatic pads 22. Each of the pads 22 includes a first base section 40 which has a concave part spherical upper surface 41. A second section 43 has a part spherical convex lower surface which is complimentary to and mates with surface 41. The two sections 40 and 43 may thus swivel relative to each other. There is an annular seal 45 or ring provided at surface 41 to seal an area of surface 41 and the mating surface of the section 43. The bearing section 43 has an outwardly facing surface 47 that opens to a surface of a flat pad 42 that is fixed to a surface of the table 10. An annular seal 46 is provided in surface 47 and defines a sealed area on the adjacent surface of the flat pad 22. The seals 45 and 46 permit the adjacent surfaces to slide on the seals. The seals are contacted by the adjacent surfaces in use of the table.

Hydraulic oil under controlled pressure (a fluid under pressure) is provided from a source 44, to each of the sealed areas defined by seals 45 and 46. The pressure acts through a passageway having a separate orifice 44A leading to the surface 41 to tend to support the section 43 on an oil film relative to surface 41. Hydraulic oil under pressure from source 44 is also provided through the same passageway from source 44 through a separate orifice 44B in the section 43 to the sealed area on surface 47 defined by annular seal 46 to provide a hydrostatic film of oil between the surface 47 and the adjacent surface of pad 42. The surface 47 and the adjacent surface of pad 42 will slide relative to each other (and thus relative to the table 10) under relatively low friction during any movement between the table and the actuators. A conventional boot or seal tube 48 shown fragmentarily in FIG. 3 is used to collect leakage or drain oil from each hydrostatic pad. The part spherical surface 41 and the mating surface of bearing section 43 permits swiveling movement between the two bearing sections for alignment as the table and pad 22 slide relative to surface 47.

The cylinder section 27 has an interior chamber 27A which is connected to a source of nitrogen under pressure (gas under pressure) indicated at 49. The nitrogen is maintained at desired pressure comprising the preload pressure. This pressure acts against the end surface 50 of the rod 31 to exert a force in direction along the rod toward the hydrostatic bearing pad 22 attached to the outer end of the rod and to provide a preload against the table side that the pad bears against. This will provide a preload force against the surface of the table on which the respective pad or plate 42 is mounted. The preload is selected so that it is greater than any load in the opposite direction (tending to force the rod 31 inwardly) which will be encountered during use.

The upper cylinder section 26 houses the internal piston 33, and a servovalve 55 controls flow of hydraulic fluid into the interior of the cylinder 26 (selectively on opposite sides of the piston) to cause movement of the rod 31 and piston 36 under control of a testing program from a program source indicated generally 56. The flow of fluid from a hydraulic pressure source 57 is directed to one side or other of the piston to reciprocate the rod 31 in accordance with the program control. A suitable stroke feedback signal on a line 60 may be provided from a stroke transducer shown at 59 for closed loop control. The program controller will have signal lines leading to control each of the individual servovalves for each actuator in a desired program.

Referring to FIG. 2, individual horizontal and vertical actuators as shown each include the cylinder sections 26 and 27 with pistons 33 in the cylinder sections 26. The vertical actuators (below the table) are connected to individual sources 49 of nitrogen under pressure as illustrated. The nitrogen chambers of the horizontal actuators 22 are connected together so that there is a free flow of nitrogen between the pair of actuators directly oppositely positioned on the opposite sides of the table (and also at the ends of the table). As one of the rods of a horizontal actuator tends to move into its respective cylinder section 27 (retract), the rod on the directly aligned actuator 27 (as shown by the center lines in FIG. 1) on the opposite side or end of the table will be moving outwardly. Conduits such as that shown at 65 connect the paired cylinder sections 27 and permit the nitrogen to maintain a substantially equal preload pressure in each opposite actuator of the aligned pair as the table shakes or reciprocates during test.

In addition, a plurality of hold-down cylinders indicated at 70 may be provided to keep the hydrostatic pads 22 of the vertical actuators 20 operably engaged on the surfaces of blocks 75 fixed to the lower side of the table. The blocks 75 provide table surfaces against which the hydrostatic bearings or pads 22 of the vertical actuator will operate as the table reciprocates horizontally. The hold-down cylinders 70 are connected to the base 11 with a connecting coupling 71. An interior piston 72 and rod 74 are part of the hold-down actuator assemblies. The cylinder chamber above the piston 72 is connected to an independant source 73 of nitrogen under pressure to maintain a desired constant pressure creating a tension in the rod 74 against a coupling shown schematically at 76 on the table to which the rod is connected. This force is large enough to overcome the tendency of a table to unseat from or lift up from the hydrostatic bearings or pads 22 supporting the table on the vertical actuators during reciprocating vertical loads. The table inertia will tend to cause the hydrostatic bearings or pads to separate as the vertical actuators change direction at the top of their upward strokes, and the hold-down cylinder overcomes this tendency. There may be one or more hold-down cylinders, if desired. The nitrogen preload sections of the actuators and hold-down cylinders provide a preload force that is balanced around the table and provide no substantial net force on the table.

Figure 4:
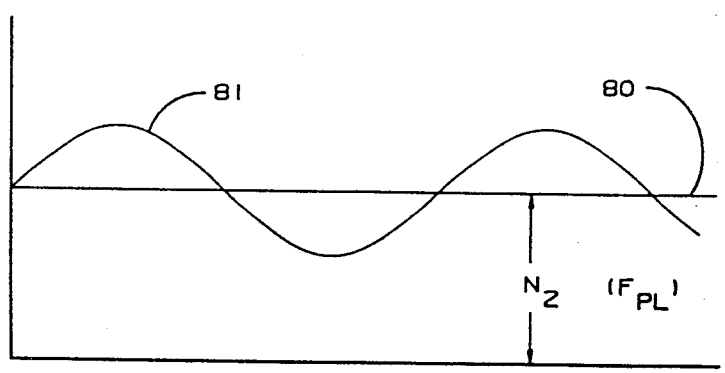
FIG. 4 is a graphic representation of a the loading achieved with the present device.

In FIG. 4, a graphical representation of a typical loading is shown. The line indicated generally at 80 is the preload force (Fpl), from the nitrogen section of the actuator, and the cyclic movement is schematically represented by the load line 81. This is the load caused by piston reciprocation in the cylinder sections 26 of each of the actuators 20. The piston movement is controlled by a test program. It can be seen that the total load never reaches the "zero" line, and thus the couplings 22 always remain under compression, the load cycles above and below the value of the mean load represented by line 80 as the actuator and table move back and forth. The force of the preload (or mean load) thus has to be greater than the dynamic load to keep the hydrostatic pads 22 in compression and thus keep the pads from separating from the adjacent surface of the table. The preload force also keeps the bearing sections 40 and 43 of each hydrostatic pad 22 from separating excessively.

As the table 10 moves up and down, the spherical surface 41 and the mating surface of section 43 of the bearing pads 22 provide an ability to tilt or swivel and still transmit actuator compression forces. The oil film within seals 45 and 46 continues to be operable.

When the horizontal actuators 20 are loaded with the sections 26 plumbed together, there is no net load or force tending to move the table during static conditions. During dynamic loading conditions the net load never returns to zero, but by proper operation of the hydraulic reciprocating sections, the table and test specimen will be reciprocated.

A simple, conventional boot or sleeve system 48 placed over the hydrostatic bearings provides a shield for leakage, and takes care of any drain flow from the hydrostatic bearings.

The seals on the actuator rods and pistons used are kept to a minimum to reduce any friction loading on the actuators. The nitrogen preload of course does not adversely affect the dynamic loads on the specimen even during the slight compression that occurs during reciprocating operation.

The "compression only" nature of the loading keeps the loading system stiff by avoiding the structures loaded as previously required, and the hydraulic distribution system is simplified because the bases of the actuators do not reciprocate and the hydraulic hoses used do not have to move. The actuators also are distributed symmetrically about the table. The mass of each of the horizontal actuators and couplings (loading pads) are completely uncoupled from the table in the direction perpendicular to the actuator axis, and this is very significant in a large table because the lowest resonant node of the table has antinodes near the table couplings. The foundation system is more easily made as well.

Additional features enhance testing with the present invention. The couplings require no holes to be present in the table, which makes the table stiffer than a similar size table with holes for couplings present, i.e. the outer shell of the table is continuous providing a rigid structure in the warp or twist modes of the table. The masses of all of the pads, bearings and actuators do not add to the table mass because the pads slide relative to the table surfaces. Thus, the mass of all of the actuators is not added to the table, but rather is isolated from the test table and specimen.

The path of load from the actuator rods to the table is through large compression carrying bearings and support plates, which minimize members loaded in bending for a stiff load path.

Although the present invention has been described with reference to preferred embodiments, workers skilled in the art will recognize that changes may be made in form and detail without departing from the spirit and scope of the invention.

What is claimed is:

1. In an actuator system for a rigid shaker test table including first actuator means for supporting the weight of the table for movement generally in vertical directions, and second actuator means for controlling the horizontal movement of the table comprising a plurality of oppositely disposed actuators on opposite sides of the table, the improvement comprising each of the second actuator means including a rod and having two actuator sections, a coupling for transferring force from the rod of each second actuator means to the table, the first of the sections for each second actuator means comprising a chamber, means to provide a compressible fluid under pressure to each chamber for exerting a load controlled by the fluid under pressure on the rod of each of the second actuator means toward a table with which the second actuator means are used under a substantially steady controlled load on the coupling between the respective rod and such table to carry a compression load to such table, and each second actuator means including a dynamic section for exerting a cyclic load on the respective rod which varies to be in addition to and subtracted from the load exerted on the rod and coupling by the first section of each second actuator means as the table is moved by the dynamic section of the second actuator means, each coupling comprising a separate hydrostatic bearing means coupled to the respective rods of each second actuator means and engaging surfaces movable with the table, said hydrostatic bearing means including two sections having mating surfaces that permit swiveling of a table relative to a respective second actuator means throughout a desired range of movement thereof and providing hydrostatic sliding bearings which carry compression loads only relative to such table, the cyclic load subtracted from the load of the first actuator section being less than the load exerted by the first actuator section to maintain compression loads on the hydrostatic bearing means.

2. In an actuator system for a rigid shaker test table including first actuator means for supporting the weight of the table for movement generally in vertical directions, and second actuator means for controlling the horizontal movement of the table comprising a plurality of oppositely disposed second actuators on opposite sides of the table, the improvement comprising each of the actuator means including a rod and having two actuator sections, a coupling for transferring force from the rod to the table, the first of the sections of each actuator means comprising means for providing a pressure controlled by gaseous fluid under pressure for exerting a load on the rod of each of the actuator means toward a table with which the actuator means is used under a substantially steady load to the coupling between the respective rod and such table to carry a compression load to such table, and each actuator means including a second dynamic section for exerting a cyclic load which varies to be in addition to and subtracted from the load exerted on the rod and coupling by the first section of each actuator means as the table is moved by the dynamic section of the respective actuator means, the cyclic load subtracted from the load of the first section of the second actuators being less than the load exerted by the first section of the second actuators to maintain compression loads on the couplings of the second actuators, and the first gaseous fluid sections of two oppositely disposed second actuators being connected fluidly together to provide gaseous fluid flow and substantially equal pressure of gaseous fluid between the connected first gaseous fluid sections of two second actuators, one on each of the opposite sides of the table.

3. In an actuator system for a rigid shaker test table including first actuator means for supporting the weight the table for movement generally in vertical directions, and second actuator means for controlling the horizontal movement of the table comprising a plurality of oppositely disposed second actuators on opposite sides of the table, the improvement comprising each of the second actuator means including a rod and having two actuator sections, a coupling for transferring force from the rod to the table, the first of the sections of each second actuator means comprising means for providing a pressure controlled by a gaseous fluid under pressure for exerting a load on the rod of each of the second actuator means toward a table with which the second actuator means is used under a substantially steady load to the coupling between the respective rod and such table to carry a compression load to such table, and each second actuator means including a second dynamic section for exerting a cyclic load which varies to be in addition to and subtracted from the load exerted on the rod and coupling by the first section of each second actuator means as the table is moved by the dynamic section of the respective actuator means, the cyclic load subtracted from the load of the first section of the second actuator means being less than the load exerted by the first section of the second actuator means to maintain compression loads on the couplings of the second actuator means, the first actuator means for supporting the weight including a first gaseous fluid section for applying a load onto such table that supports the table in use, and each coupling comprising separate hydrostatic bearing means coupled to the respective rods of each actuator means, the hydrostatic bearing means engaging surfaces movable with the table, said hydrostatic bearing means providing hydrostatic sliding bearings which carry compression loads only relative to a table with which they are used, and said first sections of each actuator means providing a preload sufficient to maintain the hydrostatic sliding bearings under compression as the respective actuator means are cycled.

4. The apparatus as specified in claim 3 wherein said hydrostatic bearing means include two sections having mating surfaces that permit swiveling of a table relative to a respective actuator means throughout a desired range of movement thereof.

5. The apparatus of claim 3 and hold-down cylinder mean connected to exert a force from a pressure controlled by a gaseous fluid, the hold-down cylinder exerting a force on the table which keeps the couplings between the first actuator means and the table under compression during operation.

* * * * *